(12) United States Patent  
Tononishi

(10) Patent No.: US 9,947,958 B2  
(45) Date of Patent: Apr. 17, 2018

(54) POWER SOURCE MODULE

(71) Applicant: GS Yuasa International Ltd., Kyoto-shi (JP)

(72) Inventor: Masamitsu Tononishi, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 110 days.

(21) Appl. No.: 14/805,309

(22) Filed: Jul. 21, 2015

(65) Prior Publication Data  
US 2016/0036088 A1 Feb. 4, 2016

(30) Foreign Application Priority Data

Jul. 31, 2014 (JP) ................................. 2014-157241  
May 28, 2015 (JP) ................................. 2015-108961

(51) Int. Cl.  
H01M 10/04 (2006.01)  
H01M 2/10 (2006.01)  
H01M 2/14 (2006.01)  
H01M 10/658 (2014.01)

(52) U.S. Cl.  
CPC ..... *H01M 10/0468* (2013.01); *H01M 2/1077* (2013.01); *H01M 10/0481* (2013.01); *H01M 2/1094* (2013.01); *H01M 2/14* (2013.01); *H01M 10/658* (2015.04)

(58) Field of Classification Search  
CPC ....................... H01M 10/0468; H01M 10/0463  
See application file for complete search history.

(56) References Cited

U.S. PATENT DOCUMENTS

| 2012/0094155 | A1 | 4/2012 | Lim |
| 2012/0214046 | A1 | 8/2012 | Lim |
| 2014/0205889 | A1* | 7/2014 | Kim ..................... H01M 2/206 429/158 |

FOREIGN PATENT DOCUMENTS

| JP | H07-52658 A | 2/1995 |
| JP | 2009-048965 A | 3/2009 |
| JP | 2012-089499 A | 5/2012 |
| JP | 2012-174693 A | 9/2012 |

* cited by examiner

*Primary Examiner* — Stewart A Fraser  
*Assistant Examiner* — Rachel L Zhang  
(74) *Attorney, Agent, or Firm* — McGinn IP Law Group, PLLC.

(57) ABSTRACT

Provided is a power source module which includes: a plurality of energy storage devices stacked in a stacking direction; end plates sandwiching the plurality of energy storage devices therebetween; and a plurality of fastening bars connecting the end plates to each other; wherein the energy storage device includes: a terminal surface on which an electrode terminal is mounted; a bottom surface; and first and second side surfaces. Each of the fastening bars includes an extending portion extending parallel to the stacking direction and fastening portions extending parallel to the end plates. As viewed in the stacking direction, a total area of the fastening portions positioned in a region close to the terminal surface with respect to a center line between the terminal surface and the bottom surface is set larger than a total area of the fastening portions positioned in a region close to the bottom surface with respect to the center line.

20 Claims, 12 Drawing Sheets

POWER SOURCE MODULE

CROSS-REFERENCE TO RELATED APPLICATIONS

This application claims the benefit of Japanese patent applications No. 2014-157241, filed on Jul. 31, 2014, and No. 2015-108961, filed on May 28, 2015, which are incorporated by reference.

FIELD

The present invention relates to a power source module using energy storage devices such as secondary batteries, for example.

BACKGROUND

A secondary battery has been popularly used as a power source for electronic equipment such as a mobile phone or IT equipment in addition to an application where a primary battery is replaced with a secondary battery. Particularly, a nonaqueous electrolyte secondary battery represented by a lithium ion secondary battery possesses high energy density and hence, the application of the nonaqueous electrolyte secondary battery to electrical equipment such as an electric vehicle has been in progress. In this case, aiming at the outputting of high energy and the acquisition of large capacity, the secondary batteries have been used in the form of a power source module in general.

The power source module is formed of a cell stack in which a plurality of secondary batteries are arranged as battery cells, and electrode terminals of the respective batteries are connected in the cell stack. Due to such a configuration, the power source module functions as one power source of high voltage and large capacity (see JP-A-2009-048965 including FIG. 1, for example).

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The conventional power source module disclosed in JP-A-2009-048965 has the following drawback. That is, from a viewpoint of preventing the positional displacement of the batteries, the cell stack of the power source module is fastened such that a load applied to a vertically lower side of the cell stack is set larger than a load applied to a vertically upper side of the cell stack along the arrangement direction of the batteries. The inventor of the present invention has found that such a configuration lowers productivity of the cell stacks.

An object of the present invention to provide a power source module which can enhance productivity thereof.

An aspect of the present invention is directed to a power source module which includes: a plurality of energy storage devices stacked in a stacking direction; end plates sandwiching the plurality of energy storage devices therebetween; and a plurality of fastening bars connecting the end plates to each other, wherein the energy storage device includes: a terminal surface on which an electrode terminal is mounted; a bottom surface arranged on a side opposite to the terminal surface; and first and second side surfaces extending parallel to the stacking direction and connecting the terminal surface and the bottom surface to each other, each of the fastening bars includes a first portion extending parallel to the stacking direction and second portions extending parallel to the end plates, and, as viewed in the stacking direction, a total area of the second portions positioned in a region close to the terminal surface with respect to a center line between the terminal surface and the bottom surface is set larger than a total area of the second portions positioned in a region close to the bottom surface with respect to the center line.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
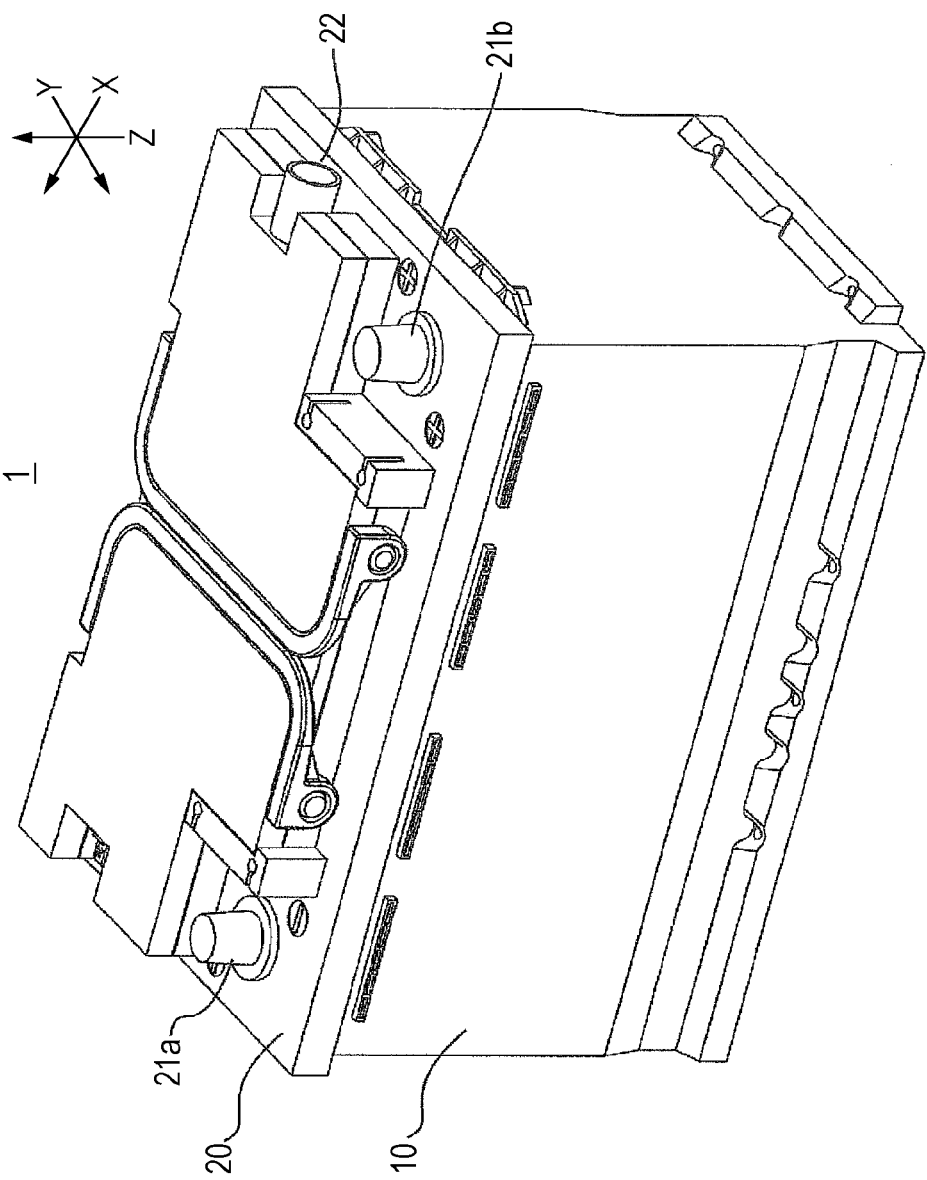
FIG. 1 is a perspective view showing a configuration of a power source pack according to an embodiment 1 of the present invention.

An aspect of the present invention is directed to a power source module which includes: a plurality of energy storage devices stacked in a stacking direction; end plates sandwiching the plurality of energy storage devices therebetween; and a plurality of fastening bars connecting the end plates to each other, wherein the energy storage device includes: a terminal surface on which an electrode terminal is mounted; a bottom surface arranged on a side opposite to the terminal surface; and first and second side surfaces extending parallel to the stacking direction and connecting the terminal surface and the bottom surface to each other, each of the fastening bars includes a first portion extending parallel to the stacking direction and second portions extending parallel to the end plates, and, as viewed in the stacking direction, a total area of the second portions positioned in a region close to the terminal surface with respect to a center line between the terminal surface and the bottom surface is set larger than a total area of the second portions positioned in a region close to the bottom surface with respect to the center line.

Another aspect of the present invention is directed to a power source module which includes: a plurality of energy storage devices stacked in a stacking direction; end plates sandwiching the plurality of energy storage devices therebetween; and a plurality of fastening bars connecting the end plates to each other, wherein the energy storage device includes: a terminal surface on which an electrode terminal is mounted; a bottom surface arranged on a side opposite to the terminal surface; and first and second side surfaces extending parallel to the stacking direction and connecting the terminal surface and the bottom surface to each other, the fastening bars extend parallel to the stacking direction, and a total mass of the fastening bars positioned on regions of the first and second side surfaces close to the terminal surface with respect to a center line parallel to the stacking direction is larger than a total mass of the fastening bars positioned on regions of the first and second side surfaces close to the bottom surface with respect to the center line.

Each of the fastening bars may include a first portion extending parallel to the stacking direction and second portions extending parallel to the end plates.

The plurality of fastening bars may include a pair of fastening bars arranged in symmetry with respect to the plurality of energy storage devices arranged along the stacking direction.

The pair of fastening bars may be disposed along the first and second side surfaces.

The plurality of fastening bars may include the fastening bar disposed along the bottom surfaces.

The plurality of fastening bars may include the fastening bar disposed along the terminal surfaces.

The present invention having the above-mentioned configuration has an advantageous effect that productivity of a power source module can be enhanced.

Hereinafter, a power source module according to embodiment 1 of the present invention is described by reference to drawings. All of embodiments described hereinafter show one specific preferable example of the present invention. Numerical values, shapes, materials, components, arrangement positions of the components, connection states, manufacturing steps, the order of the manufacturing steps described in the following embodiments merely show one example, and these are not described with the intension of limiting the present invention. Among components in the embodiment described hereinafter, components which are not described in independent claims which express uppermost concepts are described as arbitrary or optional elements. Further, sizes and the like of the constitutional parts are not described strictly accurately in respective drawings.

Embodiment 1

1. Power Source Pack

Figure 2:
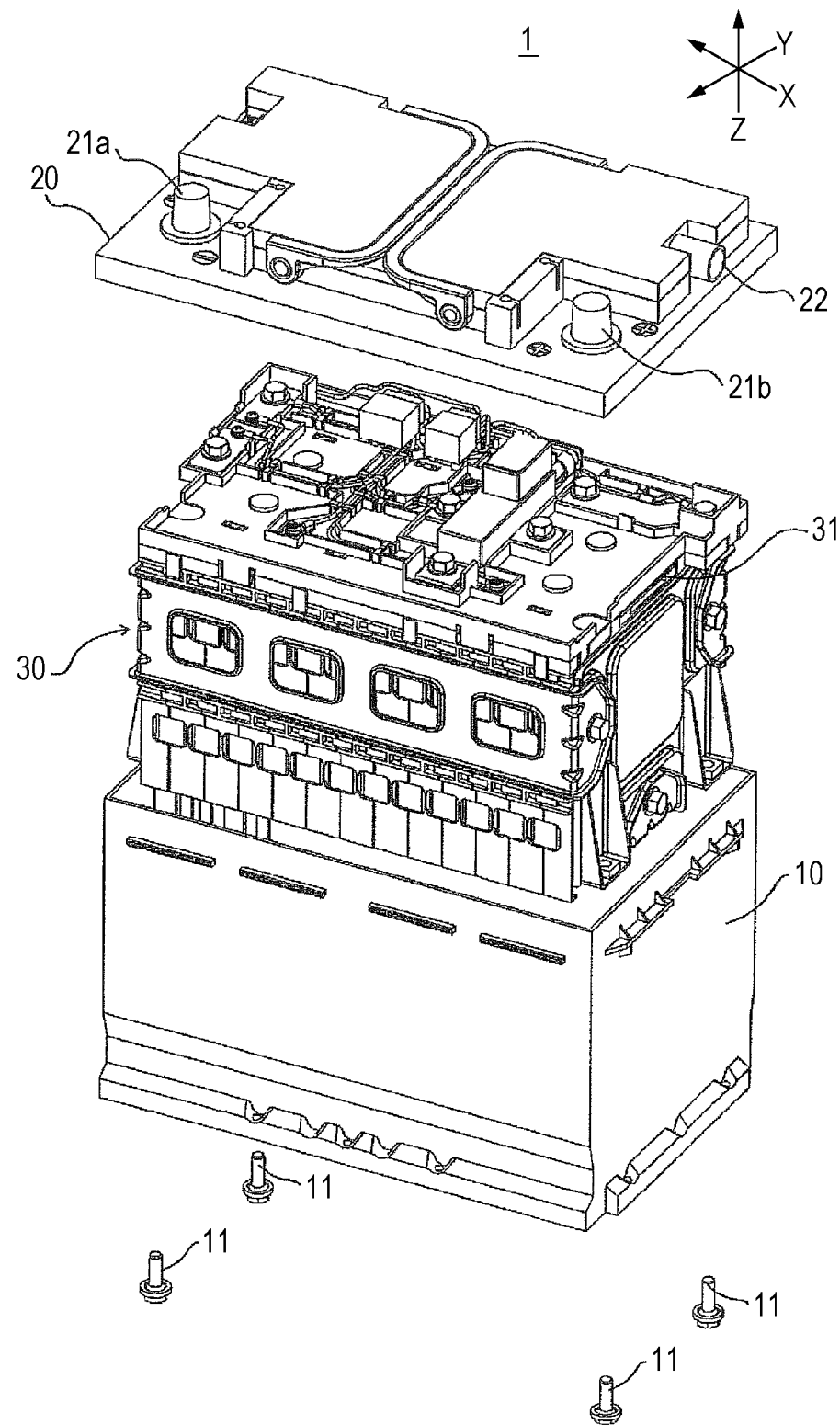
FIG. 2 is an exploded perspective view showing the configuration of the power source pack.

FIG. 1 is a perspective view showing the configuration of a power source pack 1 according to an embodiment 1 of the present invention. FIG. 2 is a perspective view, with a part exploded, schematically showing the power source pack 1.

As shown in FIG. 1, the power source pack 1 includes a housing having a hexahedral profile shape constituted of an open box-shaped container body 10 and a lid portion 20 which are made of a synthetic resin such as polypropylene.

The power source pack 1 also includes: a negative electrode terminal 21a and a positive electrode terminal 21b which are exposed from an upper surface of the lid portion 20 and are connected to an external load not shown in the drawing; and an exhaust sleeve 22 which communicates with an inner space of the housing.

As shown in FIG. 2, the power source pack 1 houses a power source module body 30 in the container body 10 of the housing. The power source module body 30 is fixed to an inner surface (bottom surface) of the container body 10 by bolts 11 which are inserted into through holes (not shown) formed in a bottom surface of the container body 10. The container body 10 is closed so as to keep airtightness by being joined to the lid portion 20 by suitable means such as ultrasonic welding or heat welding. The container body 10 and the lid portion 20 may be fastened to each other using screws, bolts or the like with a gasket interposed therebetween.

Exhaust ports 31 described later are formed in both side surfaces of the power source module body 30 respectively, and a gas generated from a cell stack formed by arranging a plurality of batteries is discharged through the exhaust ports 31. The whole housing has airtightness so that a gas discharged through the exhaust ports 31 stays in the housing and, thereafter, is discharged to the outside the power source pack 1 through the exhaust sleeve 22 of the lid portion 20.

Assume that the arrangement direction (hereinafter also referred to as "stacking direction") of batteries in the cell stack of the power source module body 30 is on a straight line which is parallel to an X axis of an orthogonal coordinate system consisting of the X axis, a Y axis and a Z axis shown in FIG. 1. Also assume that the respective surfaces of the housing, the power source module body 30 and the like which form the power source pack 1 are positioned approximately parallel to the X axis, the Y axis and the Z axis respectively. In the description made hereinafter, with respect to the directions indicated by arrows in the drawings, assume that the direction extending from a right side to a left side is the X axis direction, the direction extending from a depth side to a front side in the drawings is the Y axis direction, and the direction extending from a lower side to an upper side in the drawings is the Z axis direction.

2. Power Source Module Body

Figure 3:
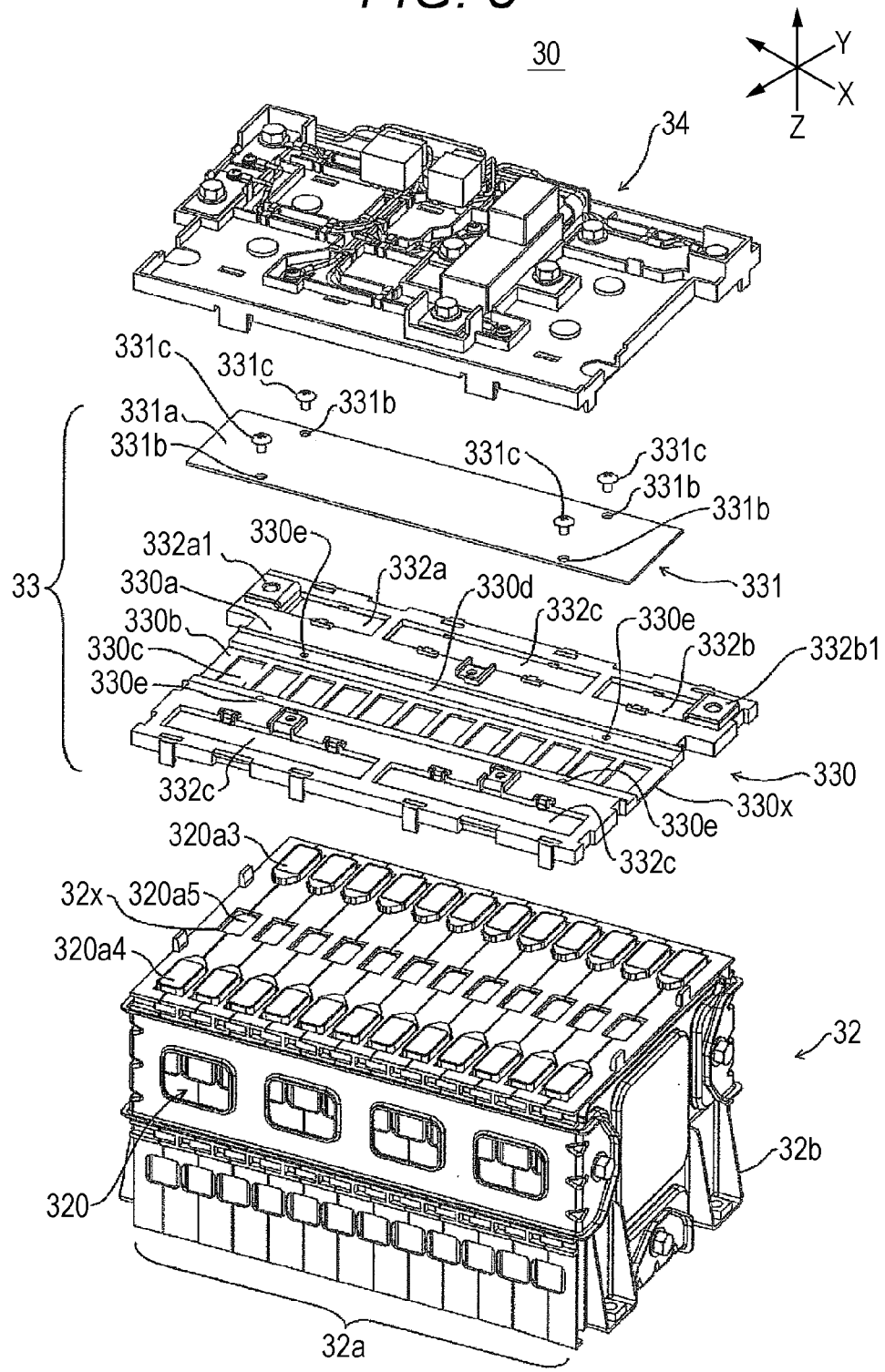
FIG. 3 is an exploded perspective view showing part of the power source pack.

FIG. 3 is a perspective view, with a part exploded, schematically showing the configuration of the power source module body 30 of the power source pack 1. As shown in FIG. 3, the power source module body 30 includes: a cell stack 32 formed by arranging batteries such as nonaqueous electrolyte secondary batteries to each other in a row and fastening the batteries together; a bus bar assembly unit 33 for electrically connecting the batteries of the cell stack 32; and an electrical component sub unit 34 which is electrically connected with the bus bar assembly unit 33.

The cell stack 32 includes: a cell stack body 320 described later; a cover 32a which covers surfaces of the cell stack body 320 and has an insulating property; and a holder 32b which is mounted on the surface of the cell stack body 320 and a surface of the cover 32a, and maintain fixed shapes of these parts. The cell stack body 320 constitutes a body portion of the cell stack 32, and is configured such that the plurality of batteries are arranged in a row such that a negative electrode terminal 320a3, a positive electrode terminal 320a4 and a safety valve 320a5 are disposed on an upper surface of each battery.

Openings for exposing the electrode terminals 320a3, 320a4 and the safety valves 320a5 of the batteries to the outside are respectively formed in an upper surface of the cover 32a. In the drawing, only openings 32x which expose the safety valves 320a5 are indicated by symbol.

The bus bar assembly unit 33 is a member made of a synthetic resin such as polypropylene having an insulating property and corrosion resistance against an electrolyte solution. The bus bar assembly unit 33 includes a frame body 330a which conforms to a profile of an upper surface of the cell stack 32. The frame body 330a has openings formed at positions corresponding to the electrode terminals 320a3, 320a4 and the safety valves 320a5 which are exposed on the cell stack 32. As a material for forming the frame body 330a, a synthetic resin such as a PBT resin having an insulating property and a heat resistant property may be used.

Sizes of the openings which are formed corresponding to the electrode terminals 320a3, 320a4 are set such that each opening extends between and over the electrodes arranged adjacently to each other in a straddling manner so as to control a connection pattern between electrode terminals corresponding to an electrical connection between the respective batteries. A metal bus bar 332a, a metal bus bar 332b and metal bus bars 332c which are connected to the electrode terminals 320a3 and the electrode terminals 320a4 are embedded in the openings respectively. The bus bar 332a and the bus bar 332b are used for connecting the electrode terminals of the cell stack 32 to each other and for connecting the cell stack 32 to the electrode terminal 21a and the electrode terminal 21b of the power source pack 1, and the bus bars 332c are used for connecting the electrode terminals of the cell stack 32 to each other.

Openings 330c which correspond to the safety valves 320a5 are formed individually in accordance with the number of batteries which form the cell stack body 320.

A groove portion 330x is formed in the frame body 330a at a position which corresponds to the openings 330c, and the groove portion 330x has a two-stage step as viewed from a surface of the frame body 330a, and both ends of the groove portion 330x reach both ends of the frame body 330a. The groove portion 330x is constituted of: a lower stage surface 330b which extends along the arrangement direction of the safety valves 320a5 and in which the openings 330c are formed; and intermediate stage surfaces 330d which are formed on edges of the lower stage surface 330b.

A heat insulator 331 is positioned above the groove portion 330x. The heat insulator 331 is a means which blocks heat radiated from the cell stack 32 thus reducing thermal influence on respective members forming the power source pack 1, the electrical component sub unit 34 which is electrical component, the lid portion 20, and electrical components incorporated in the lid portion 20 described later, all of which are positioned above the bus bar assembly unit 33. The heat insulator 331 is also a means for reinforcing the power source module body 30. The heat insulator 331 is formed of a metal-made heat insulating body plate 331a having a rectangular shape which conforms to a profile of the groove portion 330x of the bus bar assembly unit 33, and the heat insulator 331 is fitted in the intermediate stage surfaces 330d of the groove portion 330x.

The heat insulator 331 is fixed to the bus bar assembly unit 33 by threadedly engaging mounting screws 331c with mounting holes 330e formed in the frame body 330a of the bus bar assembly unit 33 through through holes 331b formed in a surface of the heat insulating body plate 331a.

The electrical component sub unit 34 is a unit which is configured such that, on a base made of a synthetic resin which is a material substantially equal to the material for forming the frame body 330a of the bus bar assembly unit 33, electrical components such as electric wires which extend via the bus bar 332a and the bus bar 332b, switches including relay switches, resistors and harnesses which are connected to the bus bars 332a, 332b and 332c are arranged. The electrical component sub unit 34 and the bus bar assembly unit 33 are electrically connected with each other by threadedly mounting bolts in mounting holes 332a1, 332b1 formed in the bus bars 332a, 332b respectively from an upper surface of the electrical component sub unit 34.

In the inside of the lid portion 20 which is positioned above the electrical component sub unit 34, a BMU (Battery Management Unit) is arranged as an electrical component. Also, an electronic part which controls charging and discharging of the power source pack 1, an electronic part which controls a state of the power source pack 1 such as a temperature of the power source pack 1, and an electronic part which allows the power source pack 1 to perform the communication with equipment to which the power source pack 1 is connected are arranged as electrical components.

3. Cell Stack

Figure 4:
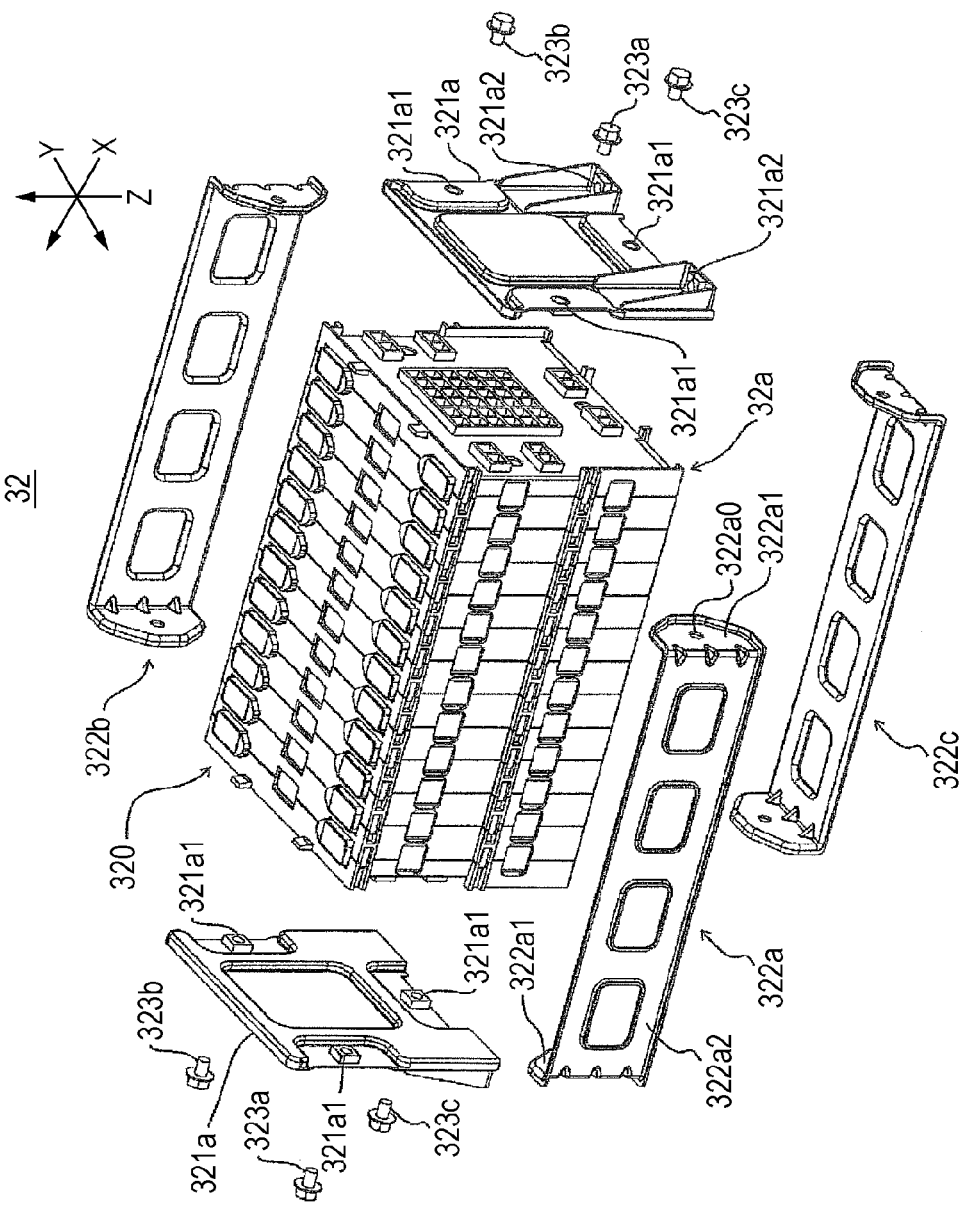
FIG. 4 is an exploded perspective view showing part of the power source pack.
Figure 5:
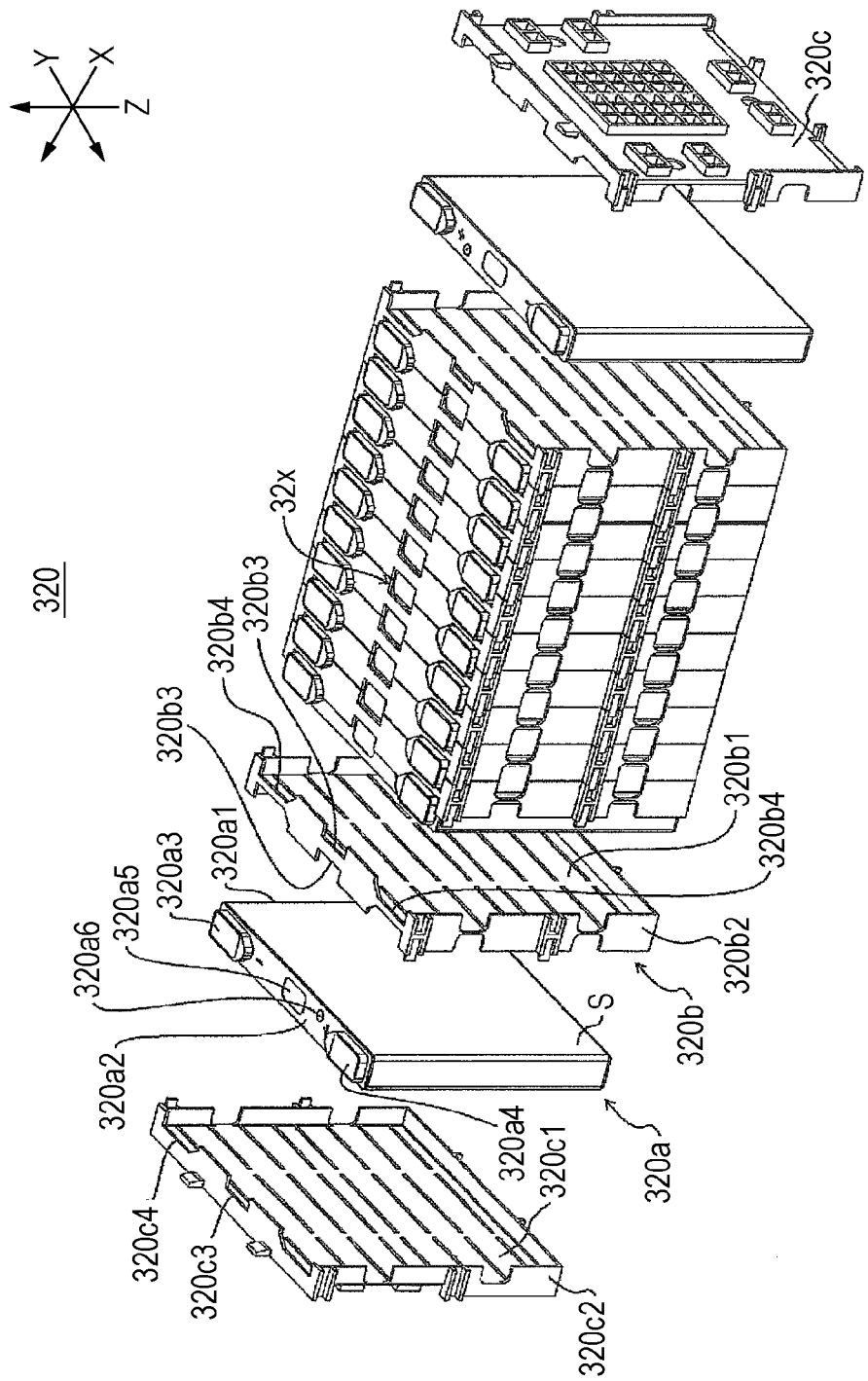
FIG. 5 is an exploded perspective view showing part of the power source pack.

FIG. 4 is a perspective view showing the configuration of the cell stack 32 of the power source pack 1 with the holder 32b in an exploded state. FIG. 5 is a perspective view showing the cell stack body 320 of the power source pack 1 in an exploded state.

As shown in FIG. 4, in the cell stack 32, the cell stack body 320 and the cover 32a which are integrally formed with each other are sandwiched by a pair of end plates 321a which is arranged at both ends of the cell stack body 320.

Using the arrangement direction of the batteries as an axis of symmetry, a fastening bar 322a and a fastening bar 322b are symmetrically arranged on side surfaces of the cell stack body 320 parallel to a Z-X plane in the drawing with respect to the axis of symmetry. A fastening bar 322c is arranged below the axis. That is, the fastening bar 322c is arranged on a bottom surface of the cell stack body 320 which is a plane parallel to a Y-X plane in the drawing.

The fastening bars 322a to 322c have the same configuration. Hereinafter, the configuration of the fastening bars 322a to 322c is described by taking the fastening bar 322a as an example.

The fastening bar 322a includes: a pair of flat-plate-shaped fastening portions 322a1 which faces the pair of end plates 321a in an opposed manner respectively; and an extending portion 322a2 which connects the fastening portions 322a1 to each other, and is formed along the arrangement direction of the batteries. That is, the fastening bar 322a includes: the extending portions 322a2 as first portions extending parallel to the stacking direction; and the fastening portions 322a1 as second portions extending parallel to the end plate 321a. A base material for forming the fastening bar 322a is formed by applying press working to a steel plate such that the base material for forming the fastening bar 322a has an approximately U shape in cross section and flanges are formed on edges of the fastening bar 322a, respectively. As one example, the fastening portions 322a1 and the extending portion 322a2 are formed by bending a single base material.

The fastening bar 322a and the end plates 321a are fixed to each other in such a manner that through holes 322a0 formed in the fastening portions 322a1 are made to overlap with the mounting holes 321a1 formed in peripheral portions of the end plates 321a, and the fastening bar 322a and the end plates 321a are fastened to each other by fastening bolts 323a. The fixing between fastening bar 322b and the end plate 321a and the fixing between the fastening bar 322c and the end plate 321a are performed in the same manner using fastening bolts 323b, 323c respectively.

Mounting holes 321a2 which open in the vertical direction are formed in a lower portion of the end plate 321a. The bolts 11 are inserted into the mounting holes 321a2 from the outside the housing, and are mounted in the mounting holes 321a2. The mounting holes 321a2 and the bolts 11 are used for fixing the power source module body 30 and the container body 10 of the housing to each other.

As shown in FIG. 5, each one of the plurality of batteries 320a which form the cell stack body 320 is a battery which includes: an outer covering body 320a1; and a lid portion 320a2, and has a flat angular columnar profile shape. The profile of the battery 320a has a top surface of the lid portion 320a2 and a bottom surface of the outer covering body 320a1 which is a surface on a side opposite to the top surface of the lid portion 320a2, and first and second side surfaces which connect the top surface of the lid portion 320a2 and the bottom surface of the outer covering body 320a1 to each other. The outer covering body 320a1 is an open box-shaped member which is made of metal such as aluminum or stainless steel, for example, and an electrode assembly and an electrolyte solution are sealed therein. The lid portion 320a2 is a member where the electrode terminal 320a3 and the electrode terminal 320a4, the safety valve 320a5 and a sealing plug 320a6 which seals an electrolyte solution filling port are mounted thereon, and an opening of the outer covering body 320a1 is sealed by laser welding or the like. The lid portion 320a2 is made of a material substantially equal to a material for forming the outer covering body 320a1. That is, the top surface of the lid portion 320a2 constitutes a terminal surface on which the electrode terminal 320a3 and the electrode terminal 320a4 are formed. In the battery 320a, a front surface of the outer covering body 320a1 may be directly exposed, or side surfaces of the outer covering body 320a1 may be covered by an insulating film except for the bottom surface of the outer covering body 320a1.

Among all side surfaces of the battery 320a, the side surface having the largest area is assumed as a main surface S. The cell stack body 320 is formed by arranging the batteries 320a such that the main surfaces S of the batteries 320a arranged adjacently to each other face each other in an opposed manner with the spacer 320b interposed therebetween.

The spacer 320b is a member made of a material having an insulating property such as a synthetic resin. The spacer 320b includes: a main plate portion 320b1 which is sandwiched between the main surfaces S of the batteries 320a; and side plate portions 320b2 which are formed on peripheral portions of the main plate portion 320b1. The side plate portions 320b2 project to both sides from the main plate portion 320b1 along the arrangement direction of the batteries 320a, and cover the front surface of the lid portion 320a2 of the battery 320a and other side surfaces of the battery 320a. Notches are formed on the side plate portion 320b2. That is, the notch 320b3 is formed on a portion of the side plate portion 320b2 which overlaps with the safety valve 320a5 of the battery 320a, and the notches 320b4 are formed on portions of the side plate portion 320b2 which interfere with the electrode terminal 320a3 and the electrode terminal 320a4.

With such a configuration, in a state where the batteries 320a and the spacers 320b are arranged so as to form the cell stack body 320, the electrode terminals 320a3 and the electrode terminals 320a4 are exposed from the upper surface of the cell stack body 320. At the same time, a pair of notches 320b3 which face each other in an opposed manner forms the opening 32x thus exposing the safety valve 320a5 from the upper surface of the cell stack body 320.

Front surfaces of the batteries 320a positioned at both ends of the cell stack body 320 are covered by spacers 320c each of which includes: a main plate portion 320c1 having the same shape as the main plate portion 320b1 of the spacer 320b; and a side plate portion 320c2 which is formed in a projecting manner from the main plate portion 320c1 only in the direction that the spacers 320c face each other. With respect to the batteries 320a at both ends of the cell stack body 320, the electrode terminal 320a3, the electrode terminal 320a4 and the safety valve 320a5 of each battery 320a are exposed on the upper surface of the cell stack body 320 through a notch 320c3 and notches 320c4 formed on the side plate portion 320c2 of the spacer 320c and through the notch 320b3 and the notches 320b4 formed on the side plate portion 320b2 of the spacer 320b arranged adjacent to the spacer 320c.

In the power source pack 1 having the above-mentioned configuration, the battery 320a corresponds to the energy storage device in the present invention, and the cell stack 32 corresponds to the power source module in the present invention.

The bus bar assembly unit 33, the electrical parts which constitute the electrical component sub unit 34, other electrical components and the electrical components such as a BMU arranged in the inside of the lid portion 20 correspond to the electrical components in the present invention.

In the cell stack 32, the centroid of a pressing force applied to the end plate 321a by the fastening bars 322a to 322c is shifted to a side of the bus bar assembly unit 33 positioned above the centroid of the batteries 320a, the bus bar assembly unit 33 forming one side surface of the cell stack 32.

That is, the fastening bars 322a to 322c impart a fastening force to the plurality of batteries 320a in the arrangement direction (stacking direction) of the plurality of batteries 320a. The fastening bars 322a to 322c are arranged so as to impart a fastening force larger than a fastening force applied to the centroid of the batteries 320a to the batteries 320a at a position above the centroid of the batteries 320a (a terminal surface side of the batteries 320a) as viewed in the stacking direction. To be more specific, as viewed in the stacking direction, the fastening bars 322a to 322c are arranged so as to fasten regions of the batteries 320a close to the terminal surfaces of the batteries 320a with a force larger than a force applied to regions of the batteries 320a close to the bottom surfaces of the batteries 320a with respect to a center line between the terminal surfaces and the bottom surfaces of the batteries 320a.

In other words, the fastening bars 322a to 322c are configured such that, as viewed in the stacking direction, a total area of fastening portions (second portions) of the fastening bars positioned in regions of the end plates close to the terminal surfaces is set larger than a total area of fastening portions (second portions) of the fastening bars positioned in regions of the end plates close to the bottom surfaces with respect to the center line between the terminal surfaces and the bottom surfaces of the batteries 320a. The fastening bars 322a to 322c are also configured such that a total mass of the fastening bars positioned on a terminal surface side is set larger than a total mass of the fastening bars positioned on a bottom surface side. The detailed description of such a configuration is made in an embodiment 3 described later.

Figure 6:
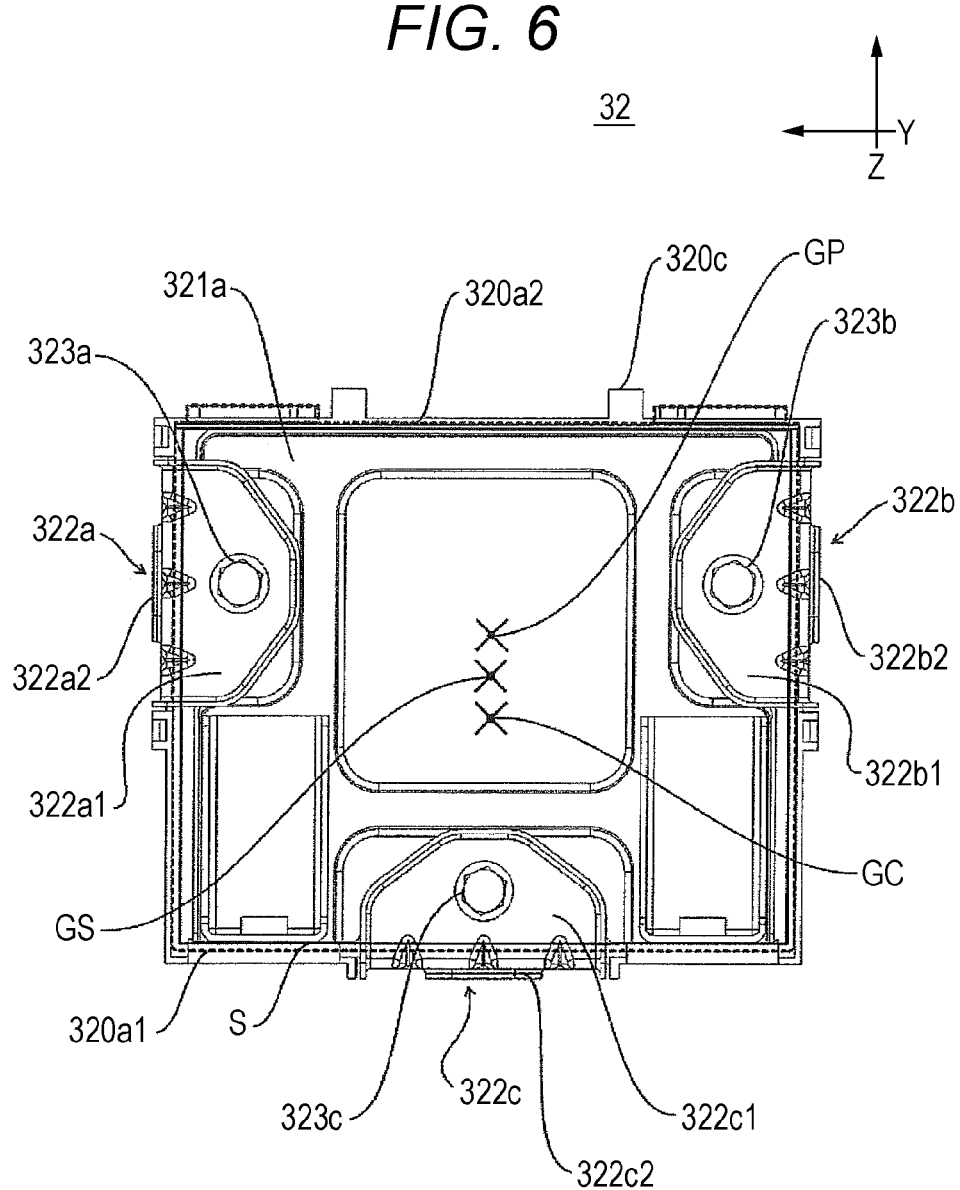
FIG. 6 is a side view showing part of a cell stack of the power source pack.

Hereinafter, the description is made by reference to FIG. 6. FIG. 6 is a side view showing part of the cell stack 32 of the power source pack 1.

As shown in FIG. 6, the fastening bars 322a to 322c and the end plates 321a are connected to each other by fastening bolts 323a to 323c. Due to such connection, it is regarded that the centers of pressing forces applied to one side surface of the cell stack body 320 projected on a Z-Y plane in the drawing which is orthogonal to the arrangement direction of the batteries 320a agree with the positions of the fastening bolts 323a to 323c. Further, the centers of respective pressing forces are combined as a centroid GP on the end plate 321a.

The centroid of the side surface of the cell stack body 320 can be regarded as a centroid GC of the batteries 320a. The centroid GP is disposed above the centroid GC in the Z axis direction in the drawing. That is, the centroid GP is disposed close to the side where the bus bar assembly unit 33 is stacked. Components such as an electrode assembly and electrolyte are housed in the battery 320a. Due to weights of these components, the centroid GC is positioned below a geometric centroid GS of a main surface S in the projection of the centroid GC on the Z-Y plane in the drawing.

With such a configuration, the following advantageous effect can be acquired. That is, in the conventional power source module, it has been a common practice to fasten and hold the whole cell stack by a holder formed of end plates and fastening bars for the purpose of maintaining a shape of the cell stack or for the purpose of suppressing the expansion of the cell stack.

In such a power source module, it is necessary to provide a space for mounting electrical components (a bus bar for connecting respective batteries which form the cell stack, switching devices such as relays connected to the bus bar and switches, a BMU which controls a charging/discharging operation of a module and a state of the module). Further, restriction is imposed on a size of a housing which houses the cell stack and electrical component therein because of a demand for miniaturization of a power source pack or circumstances such as the correspondence between the power source pack and equipment on which the power source pack is mounted.

To satisfy such demands, recently, in the power source module, as in the case of the power source module body 30 shown in FIG. 2, electrical components are collectively mounted on one specific surface of the cell stack body 320. In such a case, surfaces of the lid portions 320a2 of the batteries 320a which face the bus bar assembly unit 33 in an opposed manner constitute a reference surface on which the electrical components are mounted. Accordingly, such surfaces of the lid portions 320a2 are required to be assembled with high accuracy compared to other side surfaces of the batteries 320a when the batteries 320a are arranged as the cell stack body 320.

However, in the conventional power source module, the cell stack is fastened by the holder formed of the end plates and the fastening bars without taking shape holding property into consideration at the time of assembling the above-mentioned cell stack. The inventor of the present invention has found that batteries are individually displaced from each other at the time of fastening the cell stack or after the fastening of the cell stack so that the accuracy of assembly of the surfaces of the lid portions 320a2 as the reference surface is lowered. That is, although the cell stack is pressed and fastened by the holder such as the end plates and the fastening bars along the arrangement direction of the batteries, the batteries are held only by a frictional force based on a fastening pressure in the direction orthogonal to the arrangement direction of the batteries. Accordingly, at the time of fastening the cell stack, there is a possibility that the batteries are rotated on a plane orthogonal to the arrangement direction. After the cell stack is fastened, in the case where assembling steps are performed for a long period, there is a possibility that the positions of batteries are loosened due to the translational movement on a plane orthogonal to the arrangement direction caused by an impact or the like applied to the cell stack from the outside during storage or transportation.

The present invention has been made in view of the above-mentioned understanding. In the embodiment 1, the end plate 321a is pressed at the centroid GS disposed close to the lid portion 320a2 which is a position disposed closer to the electrical component than the centroid GC of the main surface S of the cell stack body 320 is and hence, portions of the respective batteries 320a in the vicinity of the lid portions 320a2 are held more firmly whereby the positional displacement of the batteries 320a can be suppressed.

With such a configuration, it is possible to increase the accuracy of the upper surface of the cell stack 32 on which the electrode terminals 320a3 and 320a4 and the safety valves 320a5 are formed and which functions as the reference surface on which electrical components are mounted. Eventually, the bus bar assembly unit 33 and the electrical component sub unit 34 can be favorably assembled to the cell stack 32 after the assembly of the cell stack 32 is completed and hence, productivity of the power source module body 30 can be enhanced.

Further, in the embodiment 1, the end plate 321a is pressed at the centroid GP disposed close to the lid portion 320a2 which is a position disposed closer to the electrical component than the centroid GC of the main surface S of the cell stack body 320 is and hence, the power source module of the embodiment 1 can acquire the following advantageous effect. That is, in the cell stack 32 where the X axis orthogonal to the Z-Y plane in the drawing extends in the arrangement direction, among the respective side surfaces of the cell stack 32 which are arranged parallel to the arrangement direction of the batteries 320a, the side surface to which the lid portions 320a2 belongs is not disposed adjacent to the fastening bars and hence, when the cell stack 32 receives vibrations or an impact from the outside, such a side surface forms a portion where the influence of vibrations or an impact is likely to largely appear in the power source module body 30.

In the embodiment 1, the end plate 321a is pressed at a position close to the lid portion 320a2 which is an area in the vicinity of a mounting position of the electrical components. Accordingly, a fastening force on a lid portion 320a2 side can be increased compared to other side surfaces of the cell stack 32. With such a configuration, the influence of vibrations or an impact from the outside, particularly, the influence toward an upper side (the removal of the batteries 320a from the cell stack body 320 in the upward direction, for example) can be suppressed.

In the embodiment 1, the fastening bar 322c is arranged on a lower side of the cell stack 32 and hence, with respect to the influence of an impact from the outside, the influence particularly toward a lower side (the removal of the battery 320a from the cell stack body 320 in the downward direction, for example) can be suppressed.

Figure 7:
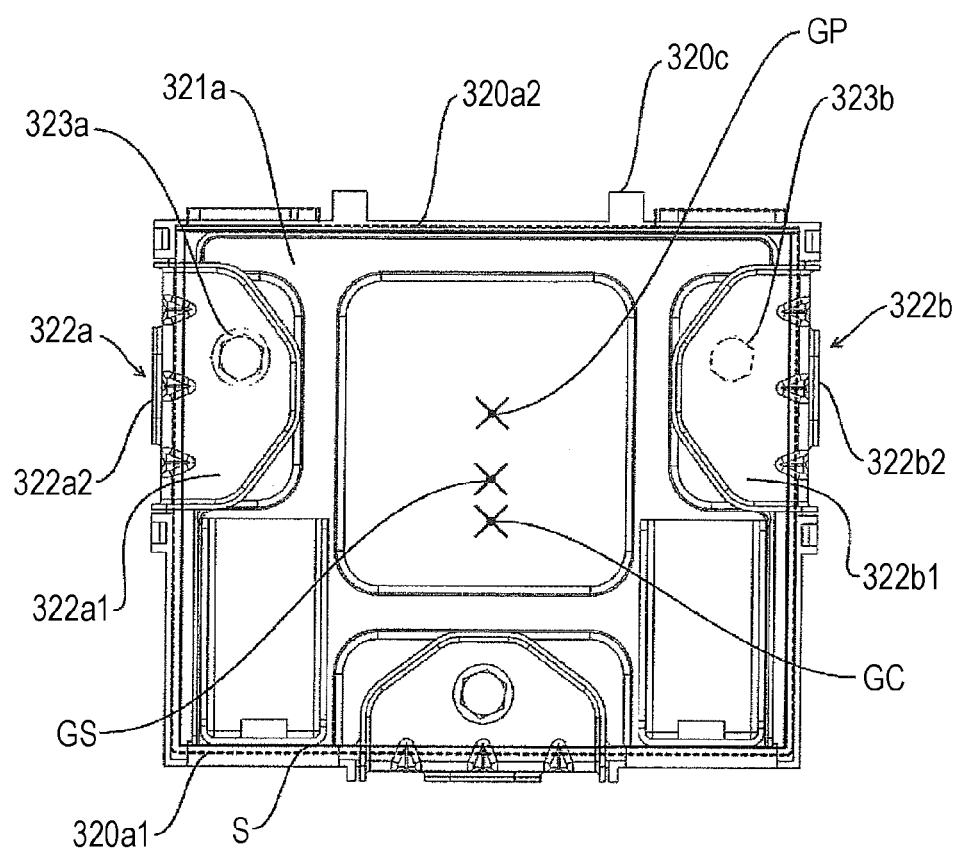
FIG. 7 is a side view showing part of another example of the cell stack of the power source pack.

In the above-mentioned description, the fastening bars 322a to 322c and the end plates 321a are configured as follows. To describe the configuration by taking the fastening bar 322a as an example, through hole 322a0 formed in the fastening portions 322a1 are made to overlap with the mounting holes 321a1 formed in the end plates 321a respectively, and the fastening portions 322a1 and the end plates 321a are fixed to each other by fastening these members using the fastening bolts 323a. In this case, a configuration shown in FIG. 7 may be adopted. FIG. 7 is a side view showing part of another constitutional example of the cell stack 32 of the power source pack 1.

That is, as shown in FIG. 7, with respect to the fastening bars 322a and 322b of the cell stack body 320 arranged parallel to an X-Y plane in the drawing, mounting positions of the fastening bolt 323a and the fastening bolt 323b which are positions where the fastening portions 322a1 and the fastening portions 322b1 are fixed to the end plates 321a respectively may be shifted further in the upward direction. In this case, the centroid GP can be further shifted to a lid portion 320a2 side so that it is possible to further enhance the above-mentioned advantageous effects of the present invention.

Embodiment 2

Figure 8:
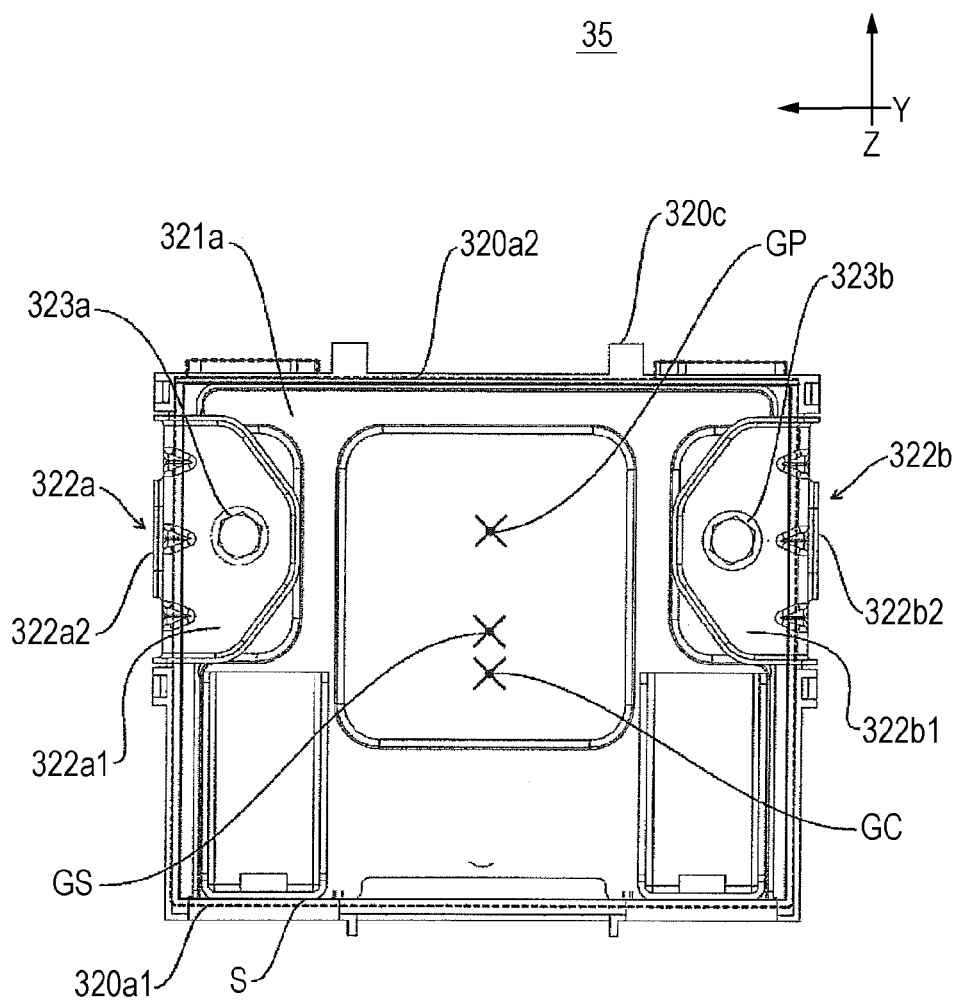
FIG. 8 is a side view showing part of a cell stack of a power source pack according to an embodiment 2 of the present invention.

FIG. 8 is a side view showing part of a cell stack 35 of a power source pack according to an embodiment 2 of the present invention. In this embodiment, the components identical or corresponding to the components shown in FIG. 1 to FIG. 7 are given the same symbols, and the detailed description of such components is omitted.

The cell stack 35 of the power source pack of the embodiment 2 is configured such that, as shown in FIG. 8, a lower fastening bar is omitted, and a cell stack body 320 is held by fastening end plates 321a using only fastening bars 322a and 322b arranged parallel to an X-Y plane in the drawing.

According to the embodiment 2, compared to the embodiment 1, the centroid of pressing force applied to the end plate 321a by fastening the fastening bars 322a and 322b can be shifted such that the center of pressing force is disposed further closer to an electrical component side than a centroid GC of a main surface S of a cell stack body 320. With such a configuration, an effect of suppressing the positional displacement of batteries 320a can be further enhanced by holding areas of cell stack body 320 in the vicinity of the lid portions 320a2 more firmly. Further, by reducing the number of fastening bars, a weight of a power source module can be reduced. In the same manner, by reducing the number of fastening bars, the number of steps of manufacturing process of the power source module can be reduced so that productivity can be increased eventually.

In the embodiment 2, the centroid of pressing force GC applied to the end plate 321a is further shifted so that the power source module of the embodiment 2 can acquire the following advantageous effect. That is, in assembling the cell stack body 320, there is a possibility that the positional displacement is generated between the batteries 320a which are made to overlap with each other in the arrangement direction at the time of sandwiching the batteries 320a between the end plates 321a and at the time of connecting the fastening bars 322a and 322b to the end plates 321a. Particularly, there is a possibility that the positional displacement of the batteries 320a are generated such that the batteries 320a are rotated about an X axis orthogonal to a Z-Y plane in the drawing which extends in the pressing direction. The larger a distance from the center of rotation, the larger the displacement of the batteries 320a generated by the positional displacement becomes.

In the embodiment 2, the centroid of pressing force GC applied to the end plate 321a is largely shifted to a position close to the lid portions 320a2 which is a side on which electrical components are mounted so that the center of rotation of the batteries is moved to the position close to the lid portions 320a2. Accordingly, the displacement of the batteries generated by the rotation of the batteries in a region of the batteries in the vicinity of the lid portions 320a2 can be suppressed to a small value thus suppressing the positional displacement of the batteries.

In the embodiment 2, the centroid of pressing force applied to the end plate 321a is determined based on the fastening of the batteries by the fastening bars 322a and 322b positioned on both side surface sides of the batteries which are disposed adjacently to the lid portions 320a2. Accordingly, the power source module of the embodiment 2 can acquire the following advantageous effect. That is, as described in an upper part of FIG. 8, when a fastening bar is arranged on a surface of the cell stack body 320 on which an electrical component such as a bus bar assembly unit 33 is mounted, the centroid of pressing force can be more directly shifted to an upper side. However, when the fastening bars is arranged in this manner, there is a possibility that a mounting space for mounting electrical components is limited, and there is also a possibility that the electrical components and the fastening bars are short-circuited.

To the contrary, by adopting the configuration of the embodiment 2, the centroid of pressing force can be shifted in the upward direction while ensuring a mounting space for mounting the electrical component and preventing a possibility of short-circuiting.

Figure 9:
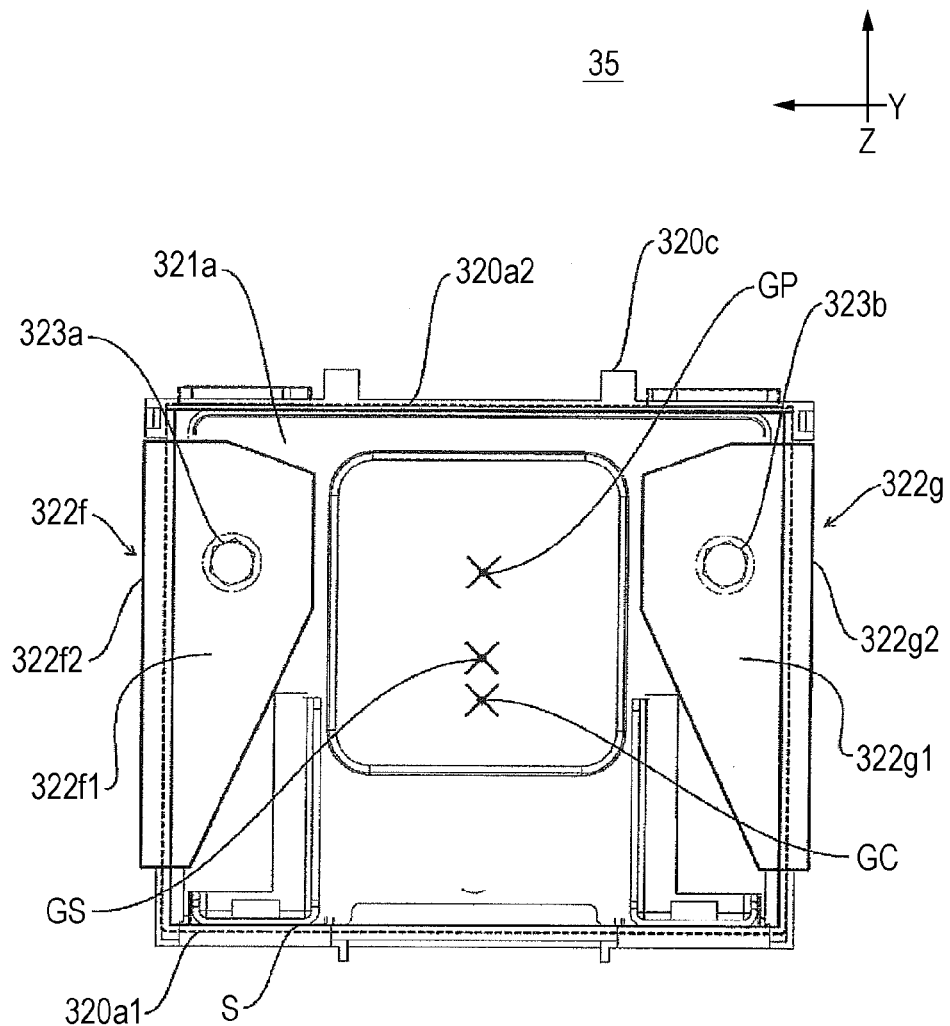
FIG. 9 is a side view showing part of another example of the cell stack of the power source pack according to the embodiment 2.

In the above-mentioned description, the fastening bars 322a, 322b are configured such that a fastening portion 322a1, 322b1 having a joint surface joined to the end plate 321a has a symmetrical shape with respect to an axis parallel to a Y axis in the drawing. However, the fastening bars in the present invention may have, as in the case of the fastening bar 322f, 322g shown in FIG. 9, fastening portions 322f1, 322g1 where a first portion close to the lid portion 320a2, that is, a portion on an electrical component side is deformed more largely than a second portion opposite to the first portion. FIG. 9 is a side view showing part of another example of the cell stack 35 of the power source pack according to the embodiment 2.

In this case, while maintaining the advantageous effect of suppressing the positional displacement acquired by the constitutional example shown in FIG. 8, the cell stack body 320 can be held in a more stable manner by increasing a pressing area of the end plate 321a and hence, reliability of the power source module can be enhanced. A size of an extending portion 322f2, 322g2 may be set to a largely elongated size in the vertical direction corresponding to a size of the fastening portion 322f1, 322g1, or may be set equal to a size of a extending portion 322a2, 322b2 of the fastening bar 322a, 322b.

Figure 10:
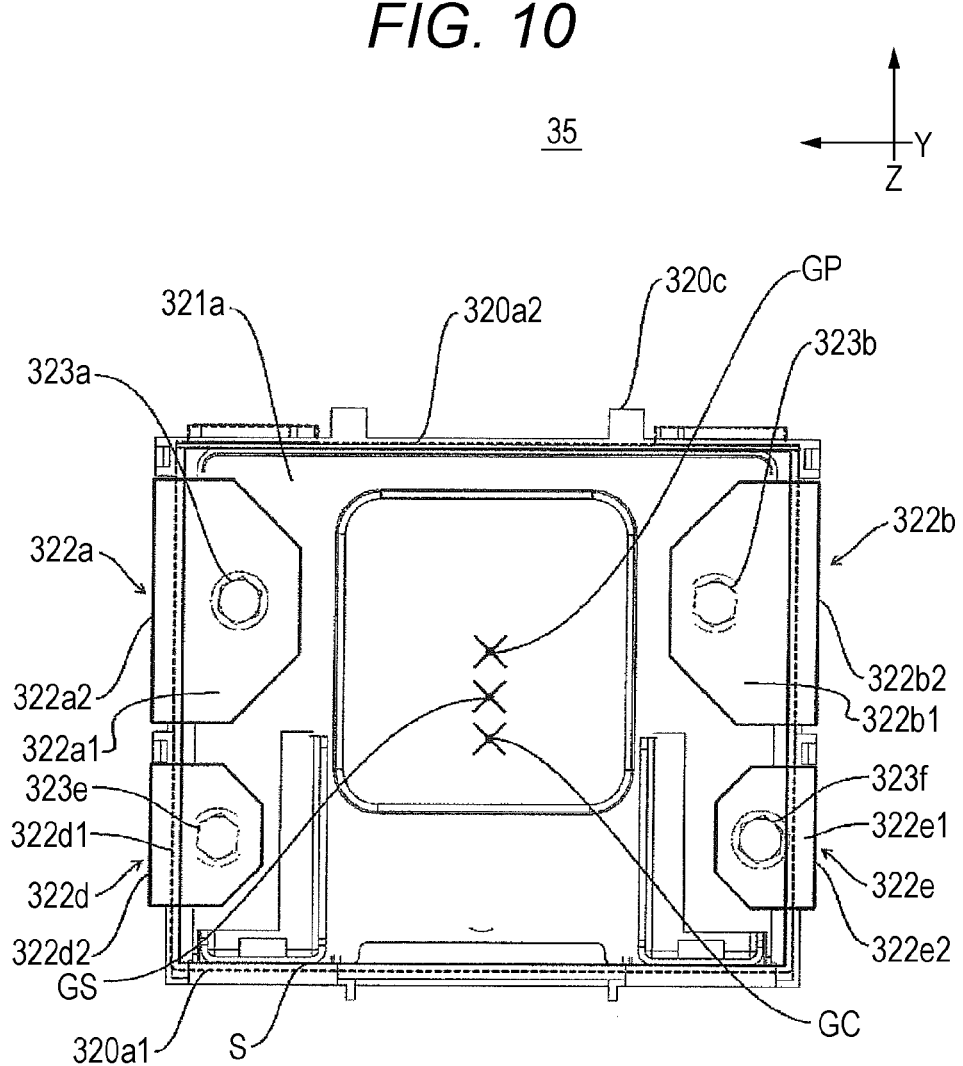
FIG. 10 is a side view showing part of another example of the cell stack of the power source pack according to the embodiment 2.

Further, as shown in FIG. 10, the fastening bars of the present invention may be realized by the combination of a fastening bar 322a and a fastening bar 322d and the combination of a fastening bar 322b and a fastening bar 322e. FIG. 10 is a side view showing part of another example of the cell stack 35 of the power source pack according to the embodiment 2.

The fastening bar 322d includes: fastening portions 322d1 each of which is smaller than the fastening portion 322a1 of the fastening bar 322a; and an extending portion 322d2. The fastening bar 322e includes: fastening portions 322e1 each of which is smaller than the fastening portion 322b1 of the fastening bar 322b; and an extending portion 322e2.

That is, even when a plurality of fastening bars which press the end plates 321a are provided for each side surface, by setting a size of the fastening portions of the fastening bar on an upper side larger than a size of the fastening portions of the fastening bar on a lower side, the centroid of pressing force can be shifted. Accordingly, the constitutional example shown in FIG. 10 can acquire substantially the same advantageous effect as the constitutional examples shown in FIG. 8 and FIG. 9.

In this case, it is desirable that a distance between the fastening bolt 323a and the fastening bolt 323b be set smaller than a distance between the fastening bolt 323e and the fastening bolt 323f. That is, it is desirable that the fixing positions of the fastening bars positioned on an upper side be disposed closer to a center side of the cell stack 35 than the fixing positions of the fastening bars positioned on a lower side. Also in this case, the constitutional example can acquire an effect of shifting the centroid of pressing force to a position further closer to an electrical component side. The distance between the fixing positions of the fastening bars on an upper side and the distance between the fixing positions of the fastening bars on a lower side may be set equal.

Also in this case, a size (a length in the stacking direction) of the extending portion 322a2, 322b2 of the fastening bar 322a, 322b may be set smaller than a size of the extending portion 322d2, 322e2 of the lower fastening bar 322d, 322e. With such a configuration, the centroid of pressing force can be further shifted to a position closer to an electrical component side. The size of the extending portion 322a2, 322b2 and the size of the extending portion 322d2, 322e2 are made different from each other within a range where the sizes of the extending portions do not become smaller than a total size of the pair of end plates 321a and the cell stack body 320 in the stacking direction.

In the configuration shown in FIG. 8, the fastening bar 322a and the fastening bar 322b arranged parallel to the X-Y plane in the drawing are positioned on an upper side as viewed in the stacking direction. However, the fastening bar 322a and the fastening bar 322b may be arranged at the same height as a centroid GS of a main surface S of the batteries 320a which form a side surface of the cell stack body 320 or at the same height as a centroid GC of the batteries 320a. In this case, by shifting the positions of the fastening bolt 323a and the fastening bolt 323b in the more upward direction in the fastening portions 322a1 and 322b1, in the same manner as the above-mentioned respective configurations, the configuration can acquire an effect of further shifting the centroid of pressing force to a position closer to an electrical component side.

Also in the embodiment 2, in the same manner as the above-mentioned embodiment 1, the fastening bars are configured such that, as viewed in the stacking direction, a total area of the fastening portions (second portions) of the fastening bars positioned in regions of the end plates close to the terminal surfaces is set larger than a total area of fastening portions (second portions) of the fastening bars positioned in regions of the end plates close to the bottom surfaces with respect to the center line between the terminal surfaces and the bottom surfaces of the batteries 320a. The fastening bars are also configured such that a total mass of the fastening bars positioned on a terminal surface side is set larger than a total mass of the fastening bars positioned on a bottom surface side. The detailed description of such a configuration is made in the following embodiment 3 by taking another configuration as an example.

Embodiment 3

Figure 11:
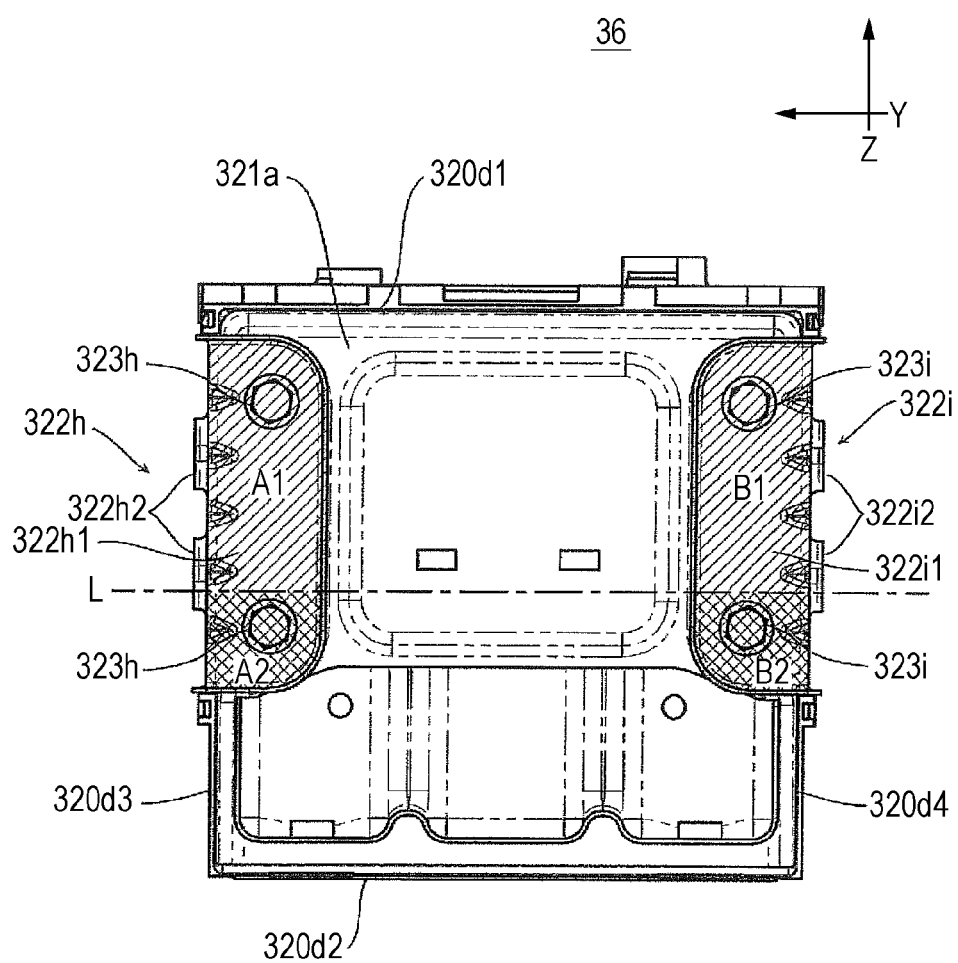
FIG. 11 is a side view showing part of a cell stack of a power source pack according to an embodiment 3 of the present invention.

FIG. 11 is a side view showing a configuration of a cell stack 36 of a power source pack according to an embodiment 3 of the present invention. In this embodiment, the components identical or corresponding to the components shown in FIG. 1 to FIG. 7 are given the same symbols, and the detailed description of such components is omitted.

The cell stack 36 of the power source pack of the embodiment 3 is configured such that, as shown in FIG. 11, in the same manner as the above-mentioned embodiment 2, a cell stack body 320 is held by fastening a pair of end plates 321a using fastening bars 322h and 322i arranged parallel to an X-Y plane in the drawing. The fastening bars 322h and 322i are the pair of fastening bars which is arranged in symmetry with respect to a plurality of batteries 320a disposed along the stacking direction.

In this embodiment, the battery 320a has: a terminal surface 320d1 on which electrode terminals 320a3, 320a4 are formed; a bottom surface 320d2 disposed on a side opposite to the terminal surface 320d1; and a first side surface 320d3 and a second side surface 320d4 which extend parallel to the stacking direction and connect the terminal surface 320d1 and the bottom surface 320d2 to each other.

That is, the fastening bars 322h and 322i are arranged along the first side surface 320d3 and the second side surface 320d4. The fastening bars 322h and 322i respectively include: extending portions 322h2 and 322i2 as first portions extending parallel to the stacking direction; and fastening portions 322h1 and 322i1 as second portions extending parallel to the end plates 321a.

Unlike the fastening bars 322a and 322b in the above-mentioned embodiment 1, the fastening bars 322h and 322i are formed such that the fastening portions 322h1 and 322i1 extend in the Z axis direction, and fastening portions 322h1 and 322i1 are fastened to the end plates 321a using two fastening bolts 323h and two fastening bolts 323i. With such a configuration, the fastening bars 322h and 322i can firmly connect the pair of end plates 321a to each other.

In such a configuration, as viewed in the stacking direction, a total area of fastening portions 322h1 and 322i1 positioned in regions of the end plate close to the terminal surfaces 320d1 (A1+B1 in FIG. 11) is set larger than a total area of the fastening portions 322h1 and 322i1 positioned in regions of the end plate close to the bottom surfaces 320d2 with respect to the center line L between the terminal surfaces 320d1 and the bottom surfaces 320d2 of the batteries. That is, the total area of portions of the plurality of fastening portions which are in contact with the end plate 321a on a terminal surface 320d1 side is set larger than the total area of portions of the plurality of fastening portions which are in contact with the end plate 321a on a bottom surface 320d2 side. Also with respect to this point, the same goes for the cell stack 32 in the above-mentioned embodiment 1 and the cell stack 35 in the above-mentioned embodiment 2.

In the above-mentioned configuration, assuming that the fastening bars are divided in two, that is, fastening bars disposed on a terminal surface 320d1 side and fastening bars disposed on a bottom surface 320d2 side with respect to a plane parallel to an X-Y plane including the center line L, a total mass of the fastening bars positioned on a terminal surface 320d1 side is set larger than a total mass of the fastening bars positioned on a bottom surface 320d2 side. That is, with respect to the center line parallel to the stacking direction, a total mass of the fastening bars 322h and 322i positioned in regions of the first side surface 320d3 and the second side surface 320d4 close to the terminal surface 320d1 is set larger than a total mass of the fastening bars 322h and 322i positioned in regions of the first side surface 320d3 and the second side surface 320d4 close to the bottom surfaces 320d2. The same also goes for the cell stack 32 in the above-mentioned embodiment 1 and the cell stack 35 in the above-mentioned embodiment 2.

With such a configuration, in the same manner as the above-mentioned embodiments 1 and 2, the end plate 321a is pressed at a position closer to the terminal surface 320d1 than to the bottom surface 320d2. With such a configuration, regions of the respective batteries 320a in the vicinity of the terminal surfaces 320d1 are held more firmly so that the positional displacement can be suppressed whereby it is possible to acquire an advantageous effect that productivity of the power source module body 30 can be enhanced.

Embodiment 4

Figure 12:
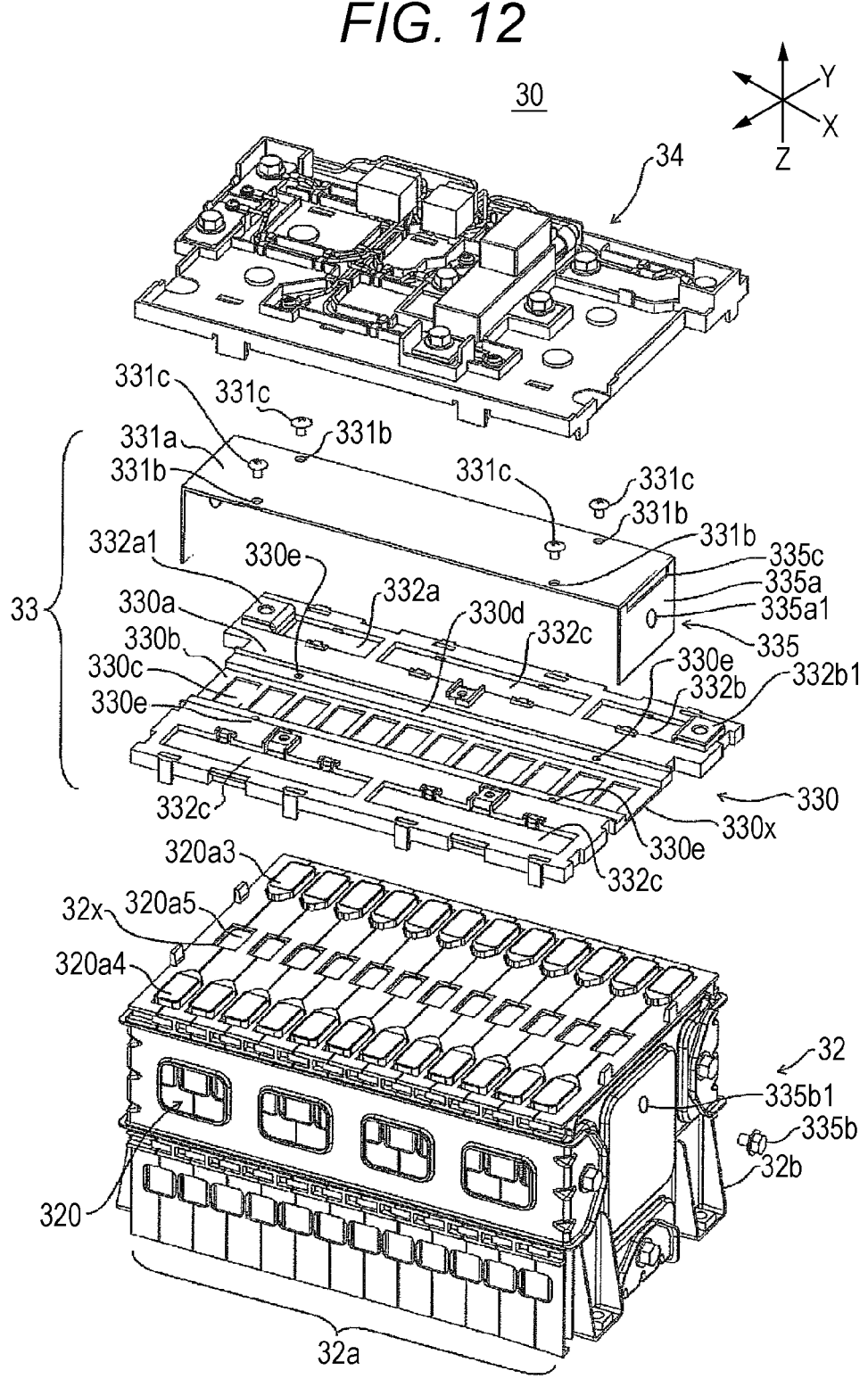
FIG. 12 is an exploded perspective view showing part of an example of a power source pack according to an embodiment 4 of the present invention.

FIG. 12 is a perspective view with a part exploded schematically showing a configuration of a power source module according to an embodiment 4 of the present invention.

As shown in FIG. 12, a power source module body 30 in the embodiment 4 is characterized by including, as a heat insulator incorporated in a bus bar assembly unit 33, a heat insulator 335 having angled portions 335a which are bent from both ends of the bus bar assembly unit 33 and extend in the downward direction, and are fixed to side surfaces of the cell stack 32.

A through hole 335a1 is formed in a lower end portion of each angled portion 335a such that the through hole 335a1 is coaxial with a mounting hole 335b1 formed in an end plate 321a at the time of temporarily assembling the power source module body 30. By inserting and fastening bolts 335b to the end plates 321a through the mounting holes 335b1 formed in the angled portions 335a, the heat insulator 335 and the cell stack 32 are fixed to each other.

Slits 335c are formed in upper portions of the angled portions 335a at positions corresponding to both ends of a groove portion 330x formed in a frame body 330a of a bus bar assembly unit 33. The slits 335c function as exhaust ports in the same manner as the exhaust ports 31 shown in FIG. 2.

The power source pack of the embodiment 4 having the above-mentioned configuration can, with the provision of the heat insulator 335 having the angled portions 335a fixed to the end plates 321a, acquire the following advantageous effects. That is, the heat insulator 335 fastens the end plates 321a in cooperation with fastening bars 322a to 322c thus functioning as a component of a holder which maintains a shape of the cell stack body 320. The heat insulator 335 corresponds to the fastening bar in the present invention. That is, a heat insulating body plate 331a corresponds to the extending portion which constitutes the first portion in the present invention, and the angled portion 335a corresponds to the fastening portion which constitutes the second portion in the present invention.

Further, the heat insulator 335 is positioned on an upper surface of the cell stack 32. Accordingly, the whole fastening bars including the fastening bars 322a to 322c are arranged in symmetry in a Z-X plane and in an X-Y plane in the drawing by taking the arrangement direction of the batteries which form the cell stack body 320 as an axis of symmetry and hence, the performance of the holder can be enhanced. That is, the heat insulator 335 functions also as a fastening bar arranged along the terminal surfaces of the batteries 320a. With such a configuration, rigidity of the cell stack 32 is increased so that a mechanical strength of the power source module body 30 can be increased.

In the above-mentioned description, the cell stack 32 is configured such that the cell stack body 320 is held by a holder having three fastening bars in the same manner as the embodiment 1. However, the cell stack 32 may be configured by combining the respective cell stacks which form the power source module of the embodiment 2 or the embodiment 3.

When the cell stack 32 is manufactured using the holder in the embodiment 4, it is desirable to manufacture the cell stack 32 in accordance with the following steps. That is, firstly, to allow the centroid of pressing force applied to the side surface of the cell stack body 320 to be shifted in the upward direction, the fastening bar 322a, the fastening bar 322 band the like (including the fastening bar 322c in the case of the embodiment 1) are assembled with the end plates 321a in advance, and the fastening bar 322a, the fastening bar 322b and the end plates 321a are fastened to each other using the fastening bolt 323a, the fastening bolt 323b and the like (including the fastening bolt 323c in the case of the embodiment 1). Thereafter, the angled portions 335a of the heat insulator 335 are assembled to the end plates 321a, and the angled portions 335a and the end plates 321a are fastened to each other by bolts 335b.

In other words, the fastening bars are fastened to the end plates 321a such that, as viewed in the stacking direction, a total area of fastening portions of the fastening bars positioned in regions of the end plate close to the terminal surfaces is set larger than a total area of fastening portions of the fastening bars positioned in regions of the end plate close to the bottom surfaces with respect to the center line between the terminal surfaces and the bottom surfaces of the batteries 320a. Alternatively, the fastening bars are fastened to the end plates 321a such that a total mass of the fastening bars positioned on a terminal surface side is set larger than a total mass of the fastening bars positioned on a bottom surface side.

By manufacturing the cell stack 32 in the above-mentioned order, a heat insulator 335 which constitutes a fastening bar can be mounted on the lid portions 320a2 in a state where the generation of positional displacement is suppressed in advance in arranging the lid portions 320a2 of the batteries 320a on which the electrode terminals 320a3 and 320a4 are mounted. Accordingly, the mounting operation of the heat insulator 335 can be performed relatively easily.

In the above-mentioned description, the fastening bars are divided in two, that is, the fastening bars disposed on a terminal surface side of the battery 320a and the fastening bars disposed on a bottom surface side of the battery 320a, and a total mass of the fastening bars positioned on a terminal surface side is set larger than a total mass of the fastening bars positioned on a bottom surface side. However, the cell stack 32 may be also configured such that a total mass of the fastening bars positioned on a terminal surface side is set smaller than a total mass of the fastening bars positioned on a bottom surface side by reducing a mass of extending portions of the fastening bars positioned on a terminal surface side.

Further, in the above-mentioned description, the description has been made such that the fastening bars such as the fastening bar 322a to 322c are respectively formed of a metal member which has an approximately U-shaped cross section and is formed by applying press working to a steel plate so as to form a flange on edges of the fastening bar. However, it is sufficient for the fastening bar to be able to fasten the end plates to each other, and the fastening bar is not specifically limited with respect to a material for forming the fastening bar, a shape of the fastening bar and a configuration of the fastening bar. The fastening bar may be constituted of a plurality of members, or may be made of a non-metal material.

In the above-mentioned description, all fastening bars respectively have the extending portion (first portion) and the fastening portions (second portion). However, it is sufficient that any one of the fastening bars may have no fastening portions. When the fastening bar has no fastening portions, the extending portion is fixed to the end plates 321a. Also in this case, the fastening bars are divided in two, that is, the fastening bars disposed on a terminal surface side of the batteries 320a and the fastening bars disposed on a bottom surface side of the batteries 320a, and a total mass of the fastening bars positioned on a terminal surface side is set larger than a total mass of the fastening bars positioned on a bottom surface side.

Further, in the present invention, provided that the cell stack is pressed in the arrangement direction of the cell stack and a centroid of a region to be pressed can be shifted toward a particular surface of the cell stack from a centroid of the energy storage devices, the present invention may be realized by the configuration other than the above-mentioned holder constituted of the end plates 321a, the fastening bars 322a to 322c and the like. As one example, the present invention may be also realized by the configuration where a cell stack is directly pressed by a housing.

In the above-mentioned description, it is assumed that the particular surface of the cell stack in the present invention is the lid portions 320a2 on which the electrode terminals 320a3 and 320a4 and the safety valve 320a5 are mounted. However, it is sufficient that the particular surface in the present invention is a surface of the cell stack which is required to be formed with high accuracy, and the particular surface in the present invention is not limited by a function, a shape or the like of the battery. For example, when a surface of the battery on which an electrode terminal is mounted and a surface of the battery on which a safety valve is mounted are different from each other, either one of such surfaces may become the particular surface.

In the above-mentioned description, the housing in the present invention is the container having a rectangular parallelepiped profile which is constituted of the container body 10 and the lid portion 20 both of which are made of a synthetic resin. However, the housing may be made of metal, other materials or the combination of these materials. The housing may be formed by combining three or more members together. Further, a profile of the housing may be a cubic shape, a cylindrical shape or a polygonal columnar shape. That is, the housing in the present invention is not limited with respect to a shape, a specific material and the configuration. The exhaust sleeve 22 mounted on the housing is an example of an exhaust port in the present invention. However, provided that the exhaust port in the present invention allows the communication between the outside and the inside of the housing, a shape, a size and the like of the exhaust port may be desirably set, and the shape of the exhaust port is not limited to the shape of the cylindrical exhaust sleeve 22 in this embodiment. As one example, the exhaust port may be an opening which is formed in a wall body with a least height (length).

In the above-mentioned description, the energy storage devices of the present invention used as the batteries for forming the cell stack are nonaqueous electrolyte secondary batteries represented by lithium ion secondary batteries. However, provided that the energy storage devices are batteries which can be charged and discharged by an electrochemical reaction, nickel-metal hydride batteries or other kinds of secondary batteries may be also used as the energy storage devices. Primary batteries may be used as the energy storage devices. Further, electric double layer capacitors or other kinds of capacitors may be used as the energy storage devices. That is, provided that the energy storage device of the present invention is an element which is formed by sealing an electrode assembly and an electrolyte solution in a storage container and can store electricity therein, the energy storage device of the present invention is not limited with respect to a specific method for generating an electromotive force.

That is, the present invention may be carried out in the form that various modifications are applied to the above-mentioned embodiments including the modifications described above provided that the present invention is carried out without departing from the gist of the present invention. The configurations which are formed by arbitrarily combining the respective components which the embodiments include also fall within the scope of the present invention.

The present invention having the above-mentioned configuration acquires an advantageous effect that productivity of a power source module can be increased, and an advantageous effect that the power source module is effectively applicable to a power source module including energy storage devices such as secondary batteries, for example.

What is claimed is:

1. A power source module, comprising:
 a plurality of energy storage devices stacked in a stacking direction;
 end plates sandwiching the plurality of energy storage devices therebetween; and
 a plurality of fastening bars connecting the end plates to each other, each of the fastening bars comprising a pair of fastening portions, the pair of fastening portions facing the end plates, respectively, said each of the fastening bars including an extending portion which connects the fastening portions to each other,
 wherein each of the energy storage devices includes:
  a terminal surface on which an electrode terminal is mounted;
  a bottom surface arranged on a side opposite to the terminal surface; and
  first and second side surfaces extending parallel to the stacking direction and connecting the terminal surface and the bottom surface to each other,
 wherein said each of the fastening bars includes a first portion extending parallel to the stacking direction and second portions extending parallel to the end plates, and
 wherein, as viewed in the stacking direction, a total area of the second portions positioned in a region close to the terminal surface with respect to a center line between the terminal surface and the bottom surface is set larger than a total area of the second portions positioned in a region close to the bottom surface with respect to the center line.

2. A power source module, comprising:
- a plurality of energy storage devices stacked in a stacking direction;
- end plates sandwiching the plurality of energy storage devices therebetween; and
- a plurality of fastening bars connecting the end plates to each other, each of the fastening bars comprising a pair of fastening portions, the pair of fastening portions facing the end plates, respectively, said each of the fastening bars including an extending portion which connects the fastening portions to each other, wherein each of the energy storage devices includes:
- a terminal surface on which an electrode terminal is mounted;
- a bottom surface arranged on a side opposite to the terminal surface; and
- first and second side surfaces extending parallel to the stacking direction and connecting the terminal surface and the bottom surface to each other, wherein the fastening bars extend parallel to the stacking direction, and wherein a total mass of the fastening bars positioned on regions of the first and second side surfaces close to the terminal surface with respect to a center line parallel to the stacking direction is larger than a total mass of the fastening bars positioned on regions of the first and second side surfaces close to the bottom surface with respect to the center line.

3. The power source module according to claim 2, wherein said each of the fastening bars includes a first portion extending parallel to the stacking direction and second portions extending parallel to the end plates.

4. The power source module according to claim 1, wherein the plurality of fastening bars include a pair of fastening bars arranged in symmetry with respect to the plurality of energy storage devices arranged along the stacking direction.

5. The power source module according to claim 2, wherein the plurality of fastening bars include a pair of fastening bars arranged in symmetry with respect to the plurality of energy storage devices arranged along the stacking direction.

6. The power source module according to claim 4, wherein the pair of fastening bars is disposed along the first and second side surfaces.

7. The power source module according to claim 5, wherein the pair of fastening bars is disposed along the first and second side surfaces.

8. The power source module according to claim 1, wherein the plurality of fastening bars include a fastening bar disposed along the bottom surfaces.

9. The power source module according to claim 2, wherein the plurality of fastening bars include a fastening bar disposed along the bottom surfaces.

10. The power source module according to claim 1, wherein the plurality of fastening bars include a fastening bar disposed along the terminal surfaces.

11. The power source module according to claim 2, wherein the plurality of fastening bars include a fastening bar disposed along the terminal surfaces.

12. The power source module according to claim 1, wherein each of the pair of fastening portions faces a respective end plate of the end plates.

13. The power source module according to claim 1, wherein each of the pair of fastening portions extends perpendicular to the stacking direction.

14. The power source module according to claim 1, wherein each of the end plates comprises a plurality of mounting holes each extending in the stacking direction through opposing surfaces of said each of the end plates.

15. The power source module according to claim 14, wherein each of the pair of fastening portions comprises a plurality of through holes for connecting said each of the pair of fastening portions to the plurality of mounting holes in the stacking direction.

16. The power source module according to claim 15, wherein the plurality of through holes in said each of the pair of fastening portions extend in the stacking direction through opposing surfaces of said each of the pair of fastening portions.

17. The power source module according to claim 2, wherein each of the pair of fastening portions extends perpendicular to the stacking direction.

18. The power source module according to claim 2, wherein each of the end plates comprises a plurality of mounting holes each extending in the stacking direction through opposing surfaces of said each of the end plates.

19. The power source module according to claim 18, wherein each of the pair of fastening portions comprises a plurality of through holes for connecting said each of the pair of fastening portions to the plurality of mounting holes in the stacking direction.

20. The power source module according to claim 19, wherein the plurality of through holes in said each of the pair of fastening portions extend in the stacking direction through opposing surfaces of said each of the pair of fastening portions.

* * * * *